United States Patent
Tseng et al.

(10) Patent No.: US 8,411,996 B2
(45) Date of Patent: Apr. 2, 2013

(54) METHOD AND APPARATUS FOR GENERATING PANORAMA

(75) Inventors: Chia-Chun Tseng, Hsinchu (TW); Chia-Yu Wu, Taichung (TW); Hong-Long Chou, Taipei (TW); Shuei-Lin Chen, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 257 days.

(21) Appl. No.: 13/044,562

(22) Filed: Mar. 10, 2011

(65) Prior Publication Data

US 2012/0177253 A1   Jul. 12, 2012

(30) Foreign Application Priority Data

Jan. 11, 2011 (TW) .............................. 100100968 A

(51) Int. Cl.
*G06K 9/36* (2006.01)
(52) U.S. Cl. ..................................................... 382/284
(58) Field of Classification Search ............... 324/76.26; 348/36, 39, E7.007; 352/69, 70; 359/725; 375/E7.1, E7.101, E7.104, E7.106, E7.112, 375/E7.114, E7.116, E7.12; 382/284
See application file for complete search history.

(56) References Cited

U.S. PATENT DOCUMENTS

| 7,064,783 B2 * | 6/2006 | Colavin et al. ............. 348/231.3 |
| 7,639,897 B2 * | 12/2009 | Gennetten et al. ............ 382/299 |
| 2001/0031005 A1 * | 10/2001 | Nister et al. ............. 375/240.16 |
| 2007/0036408 A1 | 2/2007 | Kim et al. |

FOREIGN PATENT DOCUMENTS

| JP | 200910262 | * | 3/2009 |
| JP | 201023628 | * | 6/2010 |
| TW | 200910262 | | 3/2009 |
| TW | 201023628 | | 6/2010 |

* cited by examiner

*Primary Examiner* — Gregory F Cunningham
(74) *Attorney, Agent, or Firm* — Jianq Chyun IP Office

(57) ABSTRACT

A method and an apparatus for generating a panorama are provided. In the present method, a plurality of raw images of a scene is captured. A coarse motion estimation is executed on the raw images to obtain a coarse motion estimation result of the scene. In the meantime, the raw images inside a window of interest (WOI) are cropped to obtain a plurality of cropped images, and a fine motion estimation is executed on the cropped images according to the coarse motion estimation result of the scene, so as to obtain a fine motion estimation result of the scene. The raw images are stitched and blended according to the fine motion estimation result, so as to generate the panorama.

10 Claims, 6 Drawing Sheets his application claims the priority benefit of Taiwan application serial no. 100100968, filed Jan. 11, 2011. The entirety of the above-mentioned patent application is hereby incorporated by reference herein and made a part of this specification.

METHOD AND APPARATUS FOR GENERATING PANORAMA

CROSS-REFERENCE TO RELATED APPLICATION

This application claims the priority benefit of Taiwan application serial no. 100100968, filed Jan. 11, 2011. The entirety of the above-mentioned patent application is hereby incorporated by reference herein and made a part of this specification.

BACKGROUND OF THE INVENTION

1. Field of the Invention

The invention generally relates to a method and a system for processing an image, and more particularly, to a method and a system for generating a panorama.

2. Description of Related Art

According to a conventional technique for generating a panorama, images of a same scene are captured by a camera in different angles, and motions between adjacent images are estimated so as to stitch the images together. However, the motion estimation, and accordingly the generated panorama, may not be accurate if the motions between the images are large.

Recently, a stripe-based panorama generating method has been provided to resolve aforementioned problem. In this method, motions between the images are reduced by capturing more images, and the motion estimation and image stitching are carried out by using only the central portions of the images. Since the motions between images and image distortions are reduced, this technique can produce a panorama with less image capturing limitation and better stitching effect compared to foregoing conventional technique.

FIG. 1 illustrates an example of a conventional stripe-based panorama generating method. Referring to FIG. 1, a camera is continuously moved to capture a plurality of images of an office, wherein most part of the images (including images 110, 120, and 130) are overlapped with each other. Then, images within a central bar area of the images are cropped according to a predetermined window of interest (WOI) (i.e., the cropped images 140, 150, and 160 framed by the dotted lines). Next, a motion estimation is executed on these cropped images. Eventually, the images are stitched together according to the result of the motion estimation, so as to obtain a panorama 170.

FIG. 2 is a flowchart of a conventional panorama generating method. Referring to FIG. 2, before entering the panorama generating stage, a basic image processing is usually performed on a raw image 210 captured by the charge coupled device (CCD) in the camera by using an image processing engine (step S202), wherein the basic image processing includes color filter array interpolation (CFAI), gamut correction, noise reduction, gamma mapping, and sharpness adjustment, etc. The processed image is then sent to a motion estimation module to execute a motion estimation (step S204). Eventually, the camera performs an image stitching and blending procedure according to the result of the motion estimation (step S206), so as to generate a panorama 220.

The accuracy of the motion estimation is highly related to the layout of the scene, the movement direction, and the movement extent. In order to improve the accuracy of the motion estimation, a plurality of continuous images with smaller motions should be used. However, because each image in the image sequence has to be processed by a basic image processing module, more calculations will be carried out if more images are captured. Thus, such a technique increases the computing load of the system and consumes more memory space. Thereby, a panorama generating method in which motion estimation and image processing can be carried out in a simple and quick way is desired, so as to reduce the computing load and memory consumption.

SUMMARY OF THE INVENTION

Accordingly, the invention is directed to a method and an apparatus for generating a panorama, wherein the computing load and memory required for generating the panorama are both reduced.

The invention is directed to a panorama generating method suitable for an image capturing apparatus. In the present method, a plurality of raw images of a scene is captured. A coarse motion estimation is executed on the raw images to obtain a coarse motion estimation result of the scene. In addition, the raw images inside a window of interest (WOI) are cropped to obtain a plurality of cropped images, and a fine motion estimation is executed on the cropped images according to the coarse motion estimation result of the scene, so as to obtain a fine motion estimation result of the scene. The raw images are stitched and blended according to the fine motion estimation result, so as to generate a panorama.

According to an embodiment of the invention, before executing the coarse motion estimation on the raw images, the panorama generating method further includes executing a basic image processing on the raw images, and the coarse motion estimation is executed on the processed raw images.

According to an embodiment of the invention, a search window used in the coarse motion estimation is larger than a search window used in the fine motion estimation.

According to an embodiment of the invention, before executing the fine motion estimation on the cropped images according to the coarse motion estimation result of the scene, the panorama generating method further includes executing an advanced image processing on the cropped images, and the fine motion estimation is executed on the processed cropped images.

The invention also provides a panorama generating apparatus including an image capturing unit, a coarse motion estimation unit, an image cropping unit, a fine motion estimation unit, and an image stitching unit. The image capturing unit captures a plurality of raw images of a scene. The coarse motion estimation unit executes a coarse motion estimation on the raw images to obtain a coarse motion estimation result of the scene. The image cropping unit crops the raw images inside a WOI to obtain a plurality of cropped images. The fine motion estimation unit executes a fine motion estimation on the cropped images according to the coarse motion estimation result of the scene, so as to obtain a fine motion estimation result of the scene. The image stitching unit stitches and blends the raw images according to the fine motion estimation result, so as to generate a panorama.

According to an embodiment of the invention, the panorama generating apparatus further includes a basic image processing unit. The basic image processing unit executes a basic image processing on the raw images captured by the image capturing unit and outputs the processed raw images to the coarse motion estimation unit to execute the coarse motion estimation.

According to an embodiment of the invention, a search window used by the coarse motion estimation unit is larger than a search window used by the fine motion estimation unit.

According to an embodiment of the invention, the panorama generating apparatus further includes an advanced image processing unit. The advanced image processing unit executes an advanced image processing on the cropped images, and the fine motion estimation is executed on the processed cropped images.

According to an embodiment of the invention, the WOI is a central bar area of the raw images.

According to an embodiment of the invention, the advanced image processing includes color filter array interpolation (CFAI), gamut correction, noise reduction, gamma mapping, or sharpness adjustment.

As described above, the invention provides a method and an apparatus for generating a panorama, wherein complete raw images are processed in a quick and simply way, and cropped raw images are processed in a more delicate way, so that the computing load and memory required for generating a panorama are both reduced.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
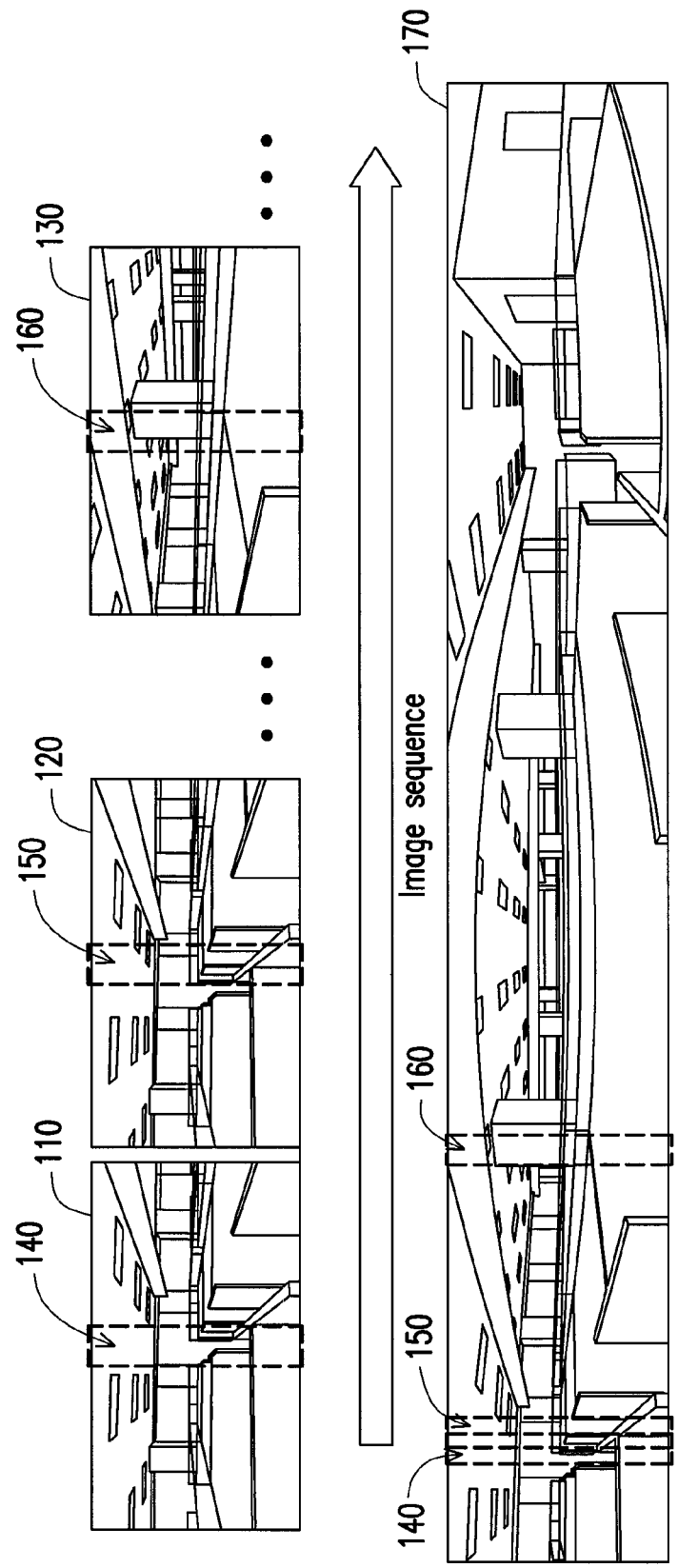
FIG. 1 illustrates an example of a conventional stripe-based panorama generating method.
Figure 2:
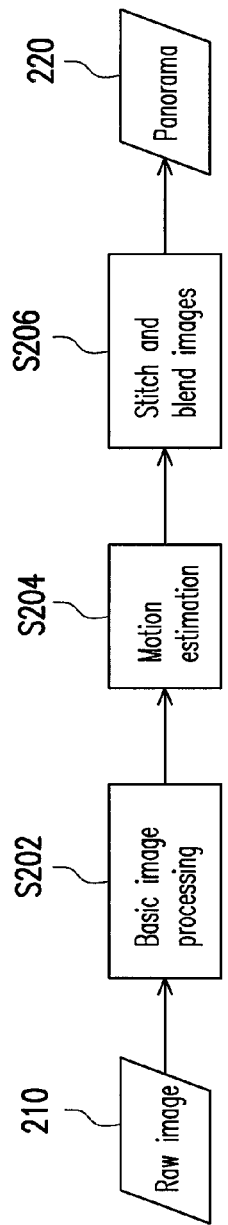
FIG. 2 is a flowchart of a conventional panorama generating method.

Reference will now be made in detail to the present preferred embodiments of the invention, examples of which are illustrated in the accompanying drawings. Wherever possible, the same reference numbers are used in the drawings and the description to refer to the same or like parts.

In order to maintain the quality of images and motion estimation when an image processing engine is used, the invention provides a technique of processing a panorama in two stages. In this technique, a coarse motion estimation is first executed on raw images at full resolution by an image processing engine. Meanwhile, the raw images at full resolution are cropped into smaller images to execute a fine image processing. The processed cropped images are then sent into a motion estimation engine. The motion estimation engine executes a fine motion estimation on the cropped images according to a coarse motion estimation result obtained above. The technique provided by the invention can produce a high-quality panorama and maintain the accuracy of motion estimation without increasing the computing load of the processor or consuming too much memory space.

Figure 3:
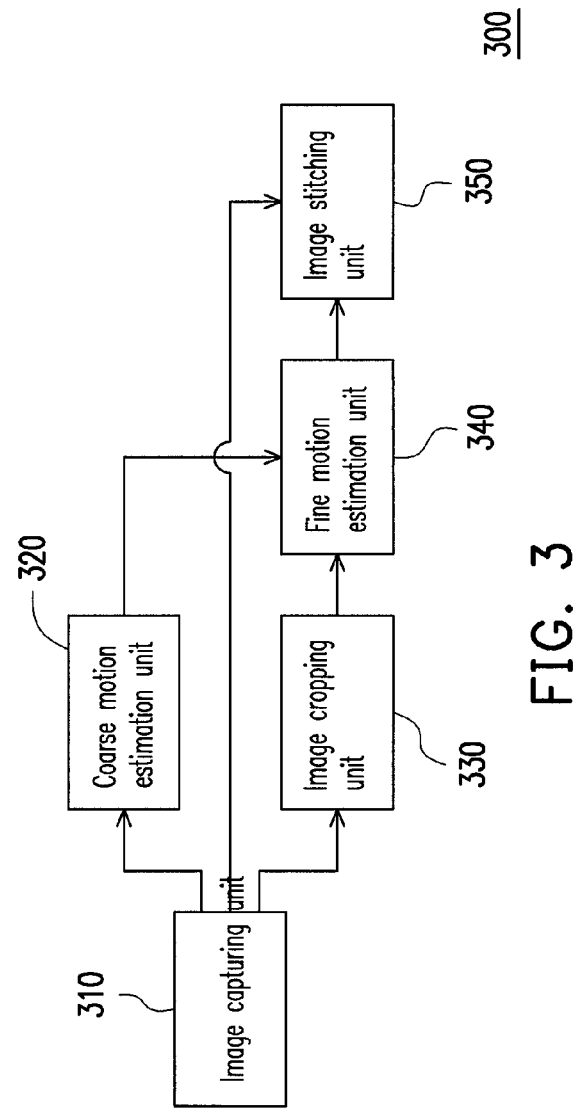
FIG. 3 is a block diagram of a panorama generating apparatus according to an embodiment of the invention.

FIG. 3 is a block diagram of a panorama generating apparatus according to an embodiment of the invention. Referring to FIG. 3, the panorama generating apparatus 300 in the present embodiment may be a digital camera, and which includes an image capturing unit 310, a coarse motion estimation unit 320, an image cropping unit 330, a fine motion estimation unit 340, and an image stitching unit 350. The functions of foregoing devices will be respectively described below.

The image capturing unit 310 may be a charge coupled device (CCD) or a complementary metal-oxide semiconductor (CMOS). The image capturing unit 310 captures a plurality of raw images of a scene. The coarse motion estimation unit 320 and the fine motion estimation unit 340 respectively compare adjacent ones of the raw images to generate a motion vector by using a search window and obtain a motion estimation result according to the motion vector. Herein the search window used by the coarse motion estimation unit 320 is larger than that used by the fine motion estimation unit 340. Thereby, the coarse motion estimation unit 320 obtains a more general motion estimation result but consumes less computing time. However, because the coarse motion estimation unit 320 can obtain the motion estimation result of the raw images and provides the motion estimation result to the fine motion estimation unit 340 for executing a fine motion estimation in a short time, the processing of the fine motion estimation is sped up and accordingly the computing load and memory requirement are both reduced.

Figure 4:
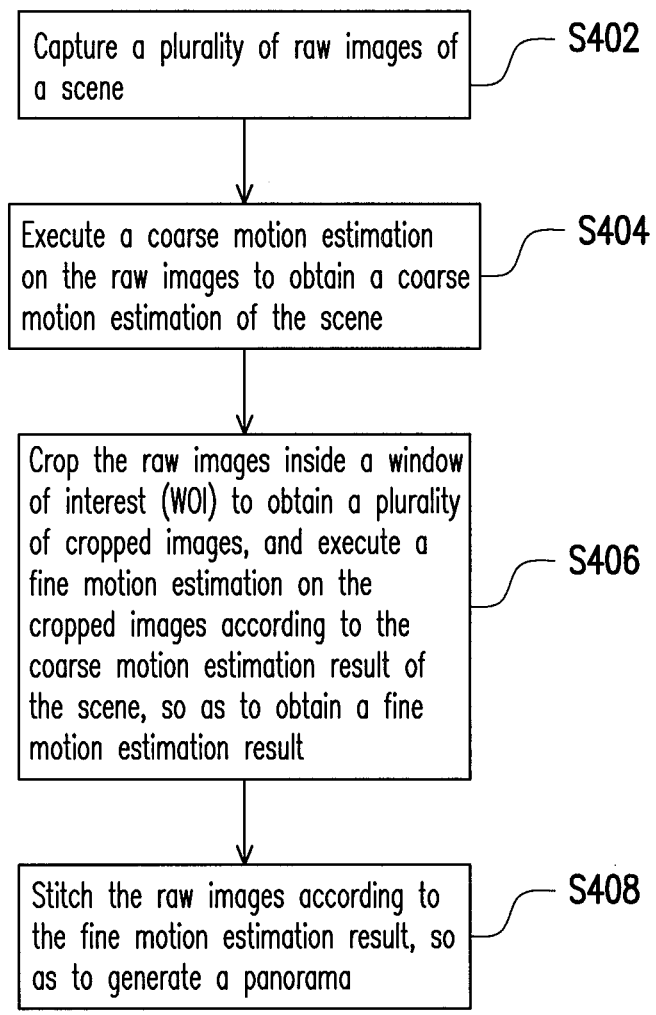
FIG. 4 is a flowchart of a panorama generating method according to an embodiment of the invention.

FIG. 4 is a flowchart of a panorama generating method according to an embodiment of the invention. Referring to FIG. 4, the panorama generating method in the present embodiment is adaptable to the panorama generating apparatus 300 illustrated in FIG. 3. Below, the panorama generating method in the present embodiment will be described in detail with reference to FIG. 3.

First, the image capturing unit 310 captures a plurality of raw images of a scene (step S402). In the present embodiment, images of adjacent areas in the scene are continuously captured by moving the panorama generating apparatus 300 and used for generating a panorama, so that the affection of movement between images can be eliminated.

Then, the coarse motion estimation unit 320 executes a coarse motion estimation on the raw images to obtain a coarse motion estimation result of the scene (step S404). Herein because the coarse motion estimation unit 320 simply performs the motion estimation roughly on the raw images, coarse motion information of the complete images can be obtained and used in subsequent fine motion estimation without taking up too much computing resources or memory space, so that the time and resources consumed by the fine motion estimation can be both reduced.

On the other hand, the image cropping unit 330 crops the raw images inside a window of interest (WOI) to obtain a plurality of cropped images, and the fine motion estimation unit 340 executes a fine motion estimation on the cropped images produced by the image cropping unit 330 according to the coarse motion estimation result obtained by the coarse motion estimation unit 320, so as to obtain a fine motion estimation result of the scene (step S408). In the present embodiment, a stripe-based panorama technique is adopted. This technique is to perform motion estimation on a central bar area of a plurality of images that are continuously captured. Accordingly, the WOI used by the image cropping unit 330 is the central bar area of the images.

Figure 5:
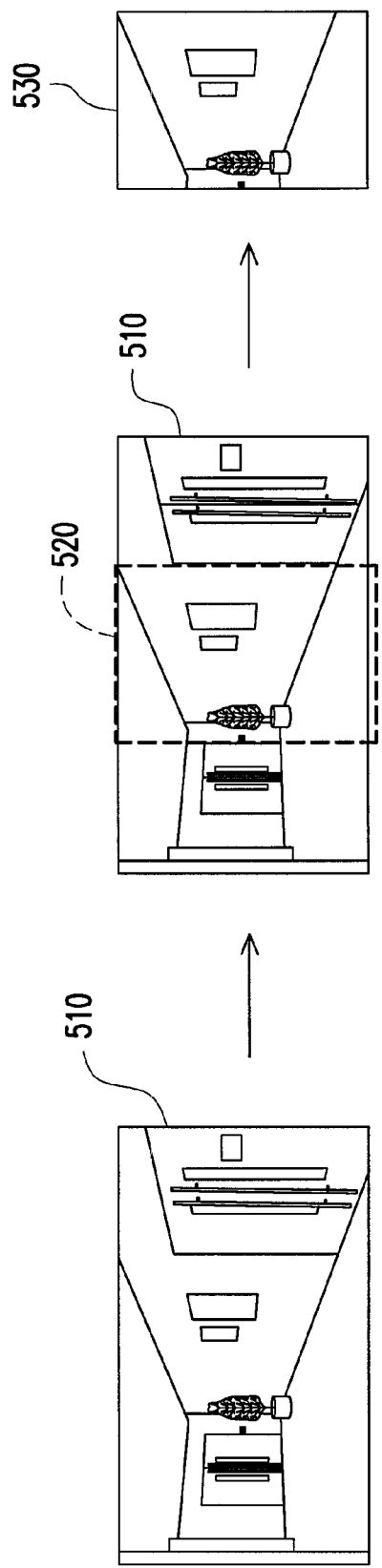
FIG. 5 illustrates an example of cropping raw images inside a window of interest (WOI) according to an embodiment of the invention.

FIG. 5 illustrates an example of cropping raw images inside a WOI according to an embodiment of the invention. Referring to FIG. 5, it is assumed that the image 510 is a raw image captured by a camera. If the WOI defined in aforementioned stripe-based panorama technique is the central bar area in the window 520, a cropped image 530 is obtained by cropping the image 510 with the window 520.

It should be understood that the fine motion estimation unit 340 executes a fine motion estimation on each image and a previous image so as to obtain motion information between the images. The accuracy of the motion estimation can be increased by executing the motion estimation on a large number of images.

Finally, an image stitching unit stitches and blends the raw images according to the fine motion estimation result, so as to generate a panorama (step S408). By executing the fine motion estimation on the cropped images (partial images) according to the coarse motion estimation result obtained based on the raw images (entire images), the time and computing load of the fine motion estimation unit 340 for executing motion estimation are effectively reduced.

It should be noted that before executing the motion estimation, the invention further includes executing a quick and simply image processing on the raw images and a high-quality image processing on the cropped images, so as to provide a high-quality panorama with reduced computing load. Below, another embodiment of the invention will be described in detail.

Figure 6:
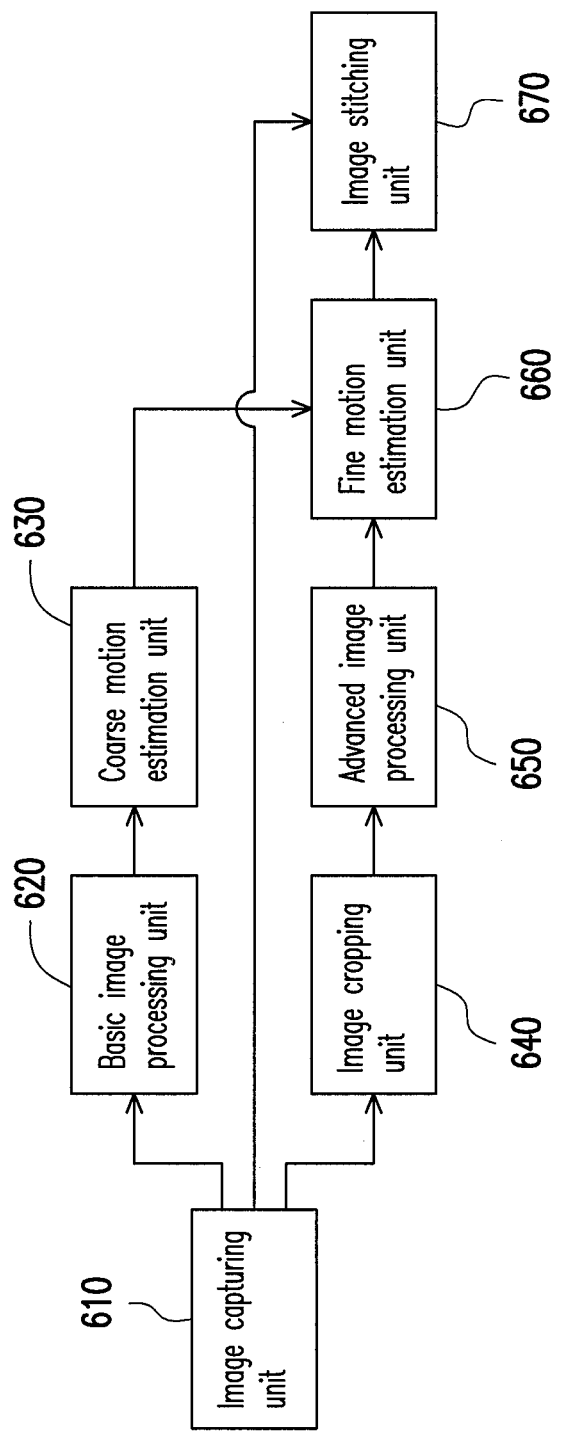
FIG. 6 is a block diagram of a panorama generating apparatus according to an embodiment of the invention.
Figure 7:
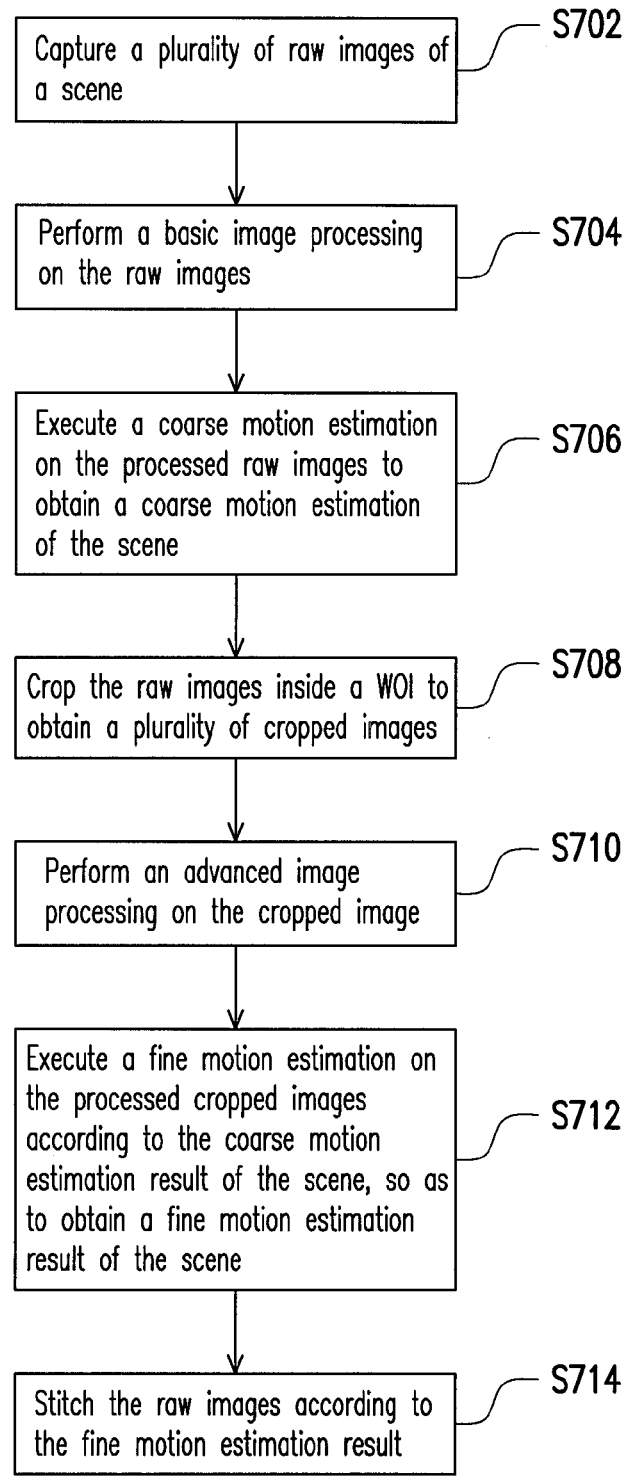
FIG. 7 is a flowchart of a panorama generating method according to an embodiment of the invention.

FIG. 6 is a block diagram of a panorama generating apparatus according to an embodiment of the invention, and FIG. 7 is a flowchart of a panorama generating method according to an embodiment of the invention. Referring to both FIG. 6 and FIG. 7, the panorama generating apparatus 600 in the present embodiment may be a digital camera, and which includes an image capturing unit 610, a basic image processing unit 620, a coarse motion estimation unit 630, an image cropping unit 640, an advanced image processing unit 650, a fine motion estimation unit 660, and an image stitching unit 670. Below, the panorama generating method in the present embodiment will be described in detail with reference to FIG. 6.

First, the image capturing unit 610 captures a plurality of raw images of a scene (step S702). Herein the raw images captured by the image capturing unit 310 are processed in two different ways: a quick and simple image processing performed by the basic image processing unit 620 and a high-quality image processing performed by the advanced image processing unit 650.

To be specific, a raw image at full resolution captured by the image capturing unit 610 is sent to the basic image processing unit 620 so that the basic image processing unit 620 can perform a basic image processing (for example, automatic white balance (AWB), tone adjustment, and noise reduction, etc) on the raw image (step S704). The output of the basic image processing unit 620 is sent to the coarse motion estimation unit 630 so that the coarse motion estimation unit 630 can execute a coarse motion estimation on this image and a previous image (step S706).

Meanwhile, the image cropping unit 640 crops the raw image at full resolution according to predetermined position and size (step S708). The cropped image is sent to the advanced image processing unit 650 so that the advanced image processing unit 650 can perform an advanced image processing (for example, color filter array interpolation (CFAI), gamut correction, noise reduction, gamma mapping, or sharpness adjustment) on this image (step S710). Herein because the cropped image has a limited size, the computing load of the processor is greatly reduced.

The processed cropped image is then sent to the fine motion estimation unit 660 so that the fine motion estimation unit 660 can execute a fine motion estimation on the cropped image and a previous image according to the coarse motion estimation result obtained by the coarse motion estimation unit 630, so as to obtain a fine motion estimation result (step S712).

Eventually, an image stitching unit stitches the raw images according to the fine motion estimation result and blends the stitched raw images to generate a panorama (step S714). By performing the basic image processing on the raw images having larger sizes, the coarse motion estimation unit 630 is allowed to obtain the motion estimation result quickly, and by performing the advanced image processing on the cropped images having smaller sizes, the fine motion estimation result obtained by the fine motion estimation unit 660 is made more accurate.

In summary, the invention provides a method and an apparatus for generating a panorama, wherein image processing and motion estimation are performed on raw images captured by an image capturing apparatus in two different stages, and advanced processing and fine motion estimation are executed on cropped images according to the results obtained from the simply processing and the coarse motion estimation, so that the computing load and memory space required for generating a panorama are both reduced, and a panorama with optimal stitching and blending effect is produced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A panorama generating method, adapted to an image capturing apparatus, the panorama generating method comprising:
    capturing a plurality of raw images of a scene;
    executing a coarse motion estimation on the raw images to obtain a coarse motion estimation result of the scene;
    cropping the raw images inside a window of interest (WOI) to obtain a plurality of cropped images, and executing a fine motion estimation on the cropped images according to the coarse motion estimation result, so as to obtain a fine motion estimation result of the scene; and
    stitching and blending the raw images according to the fine motion estimation result, so as to generate a panorama.

2. The panorama generating method according to claim 1, wherein before the step of executing the coarse motion estimation on the raw images, the panorama generating method further comprises:
    executing a basic image processing on the raw images and executing the coarse motion estimation on the processed raw images.

3. The panorama generating method according to claim 1, wherein a search window used in the coarse motion estimation is larger than a search window used in the fine motion estimation.

4. The panorama generating method according to claim 1, wherein the WOI is a central bar area of the raw images.

5. The panorama generating method according to claim 1, wherein before the step of executing the fine motion estimation on the cropped images according to the coarse motion estimation result of the scene, the panorama generating method further comprises:
    executing an advanced image processing on the cropped images, and executing the fine motion estimation on the processed cropped images, wherein the advanced image processing comprises color filter array interpolation (CFAI), gamut correction, noise reduction, gamma mapping, or sharpness adjustment.

6. A panorama generating apparatus, comprising:
an image capturing unit, configured to capture a plurality of raw images of a scene;
a coarse motion estimation unit, configured to execute a coarse motion estimation on the raw images to obtain a coarse motion estimation result of the scene;
an image cropping unit, configured to crop the raw images inside a WOI to obtain a plurality of cropped images;
a fine motion estimation unit, configured to execute a fine motion estimation on the cropped images according to the coarse motion estimation result of the scene, so as to obtain a fine motion estimation result of the scene; and
an image stitching unit, configured to stitch and blend the raw images according to the fine motion estimation result, so as to generate a panorama.

7. The panorama generating apparatus according to claim 6 further comprising:
a basic image processing unit, configured to execute a basic image processing on the raw images captured by the image capturing unit and output the processed raw images to the coarse motion estimation unit to execute the coarse motion estimation.

8. The panorama generating apparatus according to claim 6, wherein a search window used by the coarse motion estimation unit is larger than a search window used by the fine motion estimation unit.

9. The panorama generating apparatus according to claim 6, wherein the WOI is a central bar area of the raw images.

10. The panorama generating apparatus according to claim 6 further comprising:
an advanced image processing unit, configured to execute an advanced image processing on the cropped images and execute the fine motion estimation on the processed cropped images, wherein the advanced image processing comprises CFAI, gamut correction, noise reduction, gamma mapping, or sharpness adjustment.

* * * * *